May 17, 1927.
W. E. BRUCE
1,628,871
FERTILIZER OR STRAW SPREADER
Filed Oct. 20, 1925    3 Sheets-Sheet 3
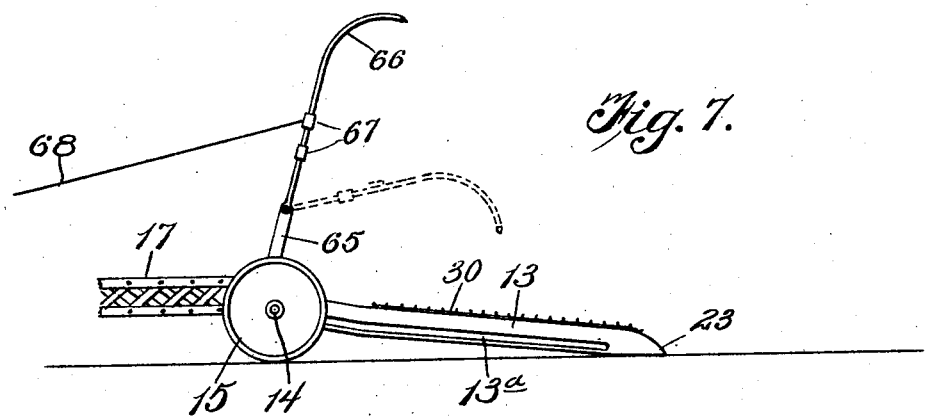
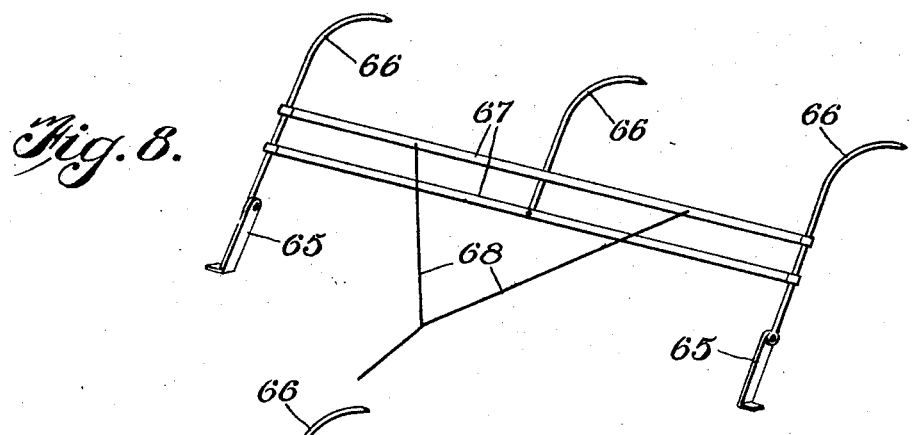
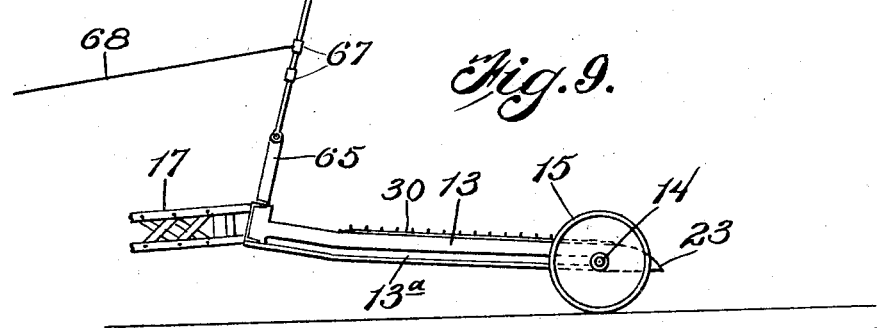
Inventor
William E. Bruce
By Watson E. Coleman
Attorney Patented May 17, 1927.

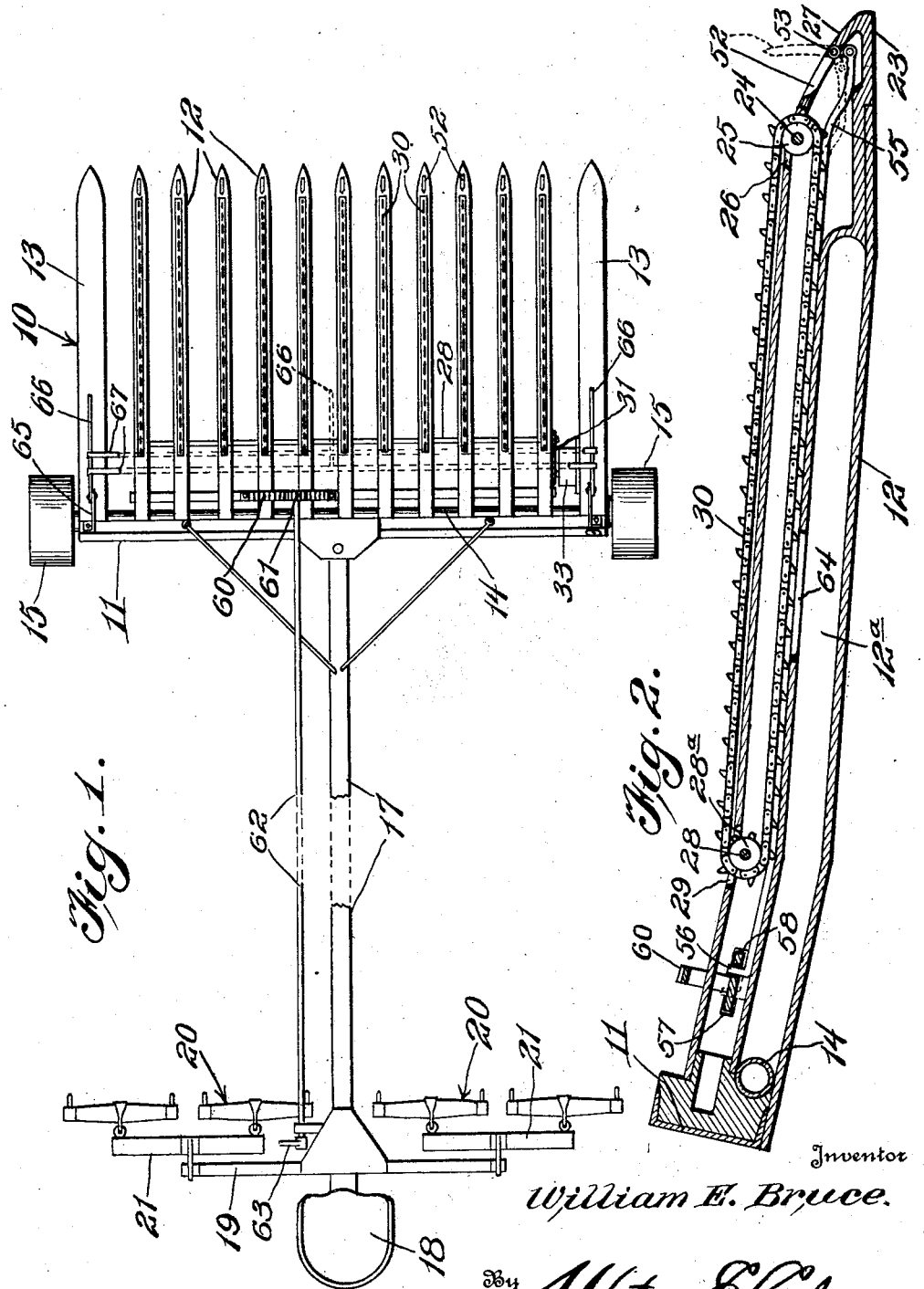

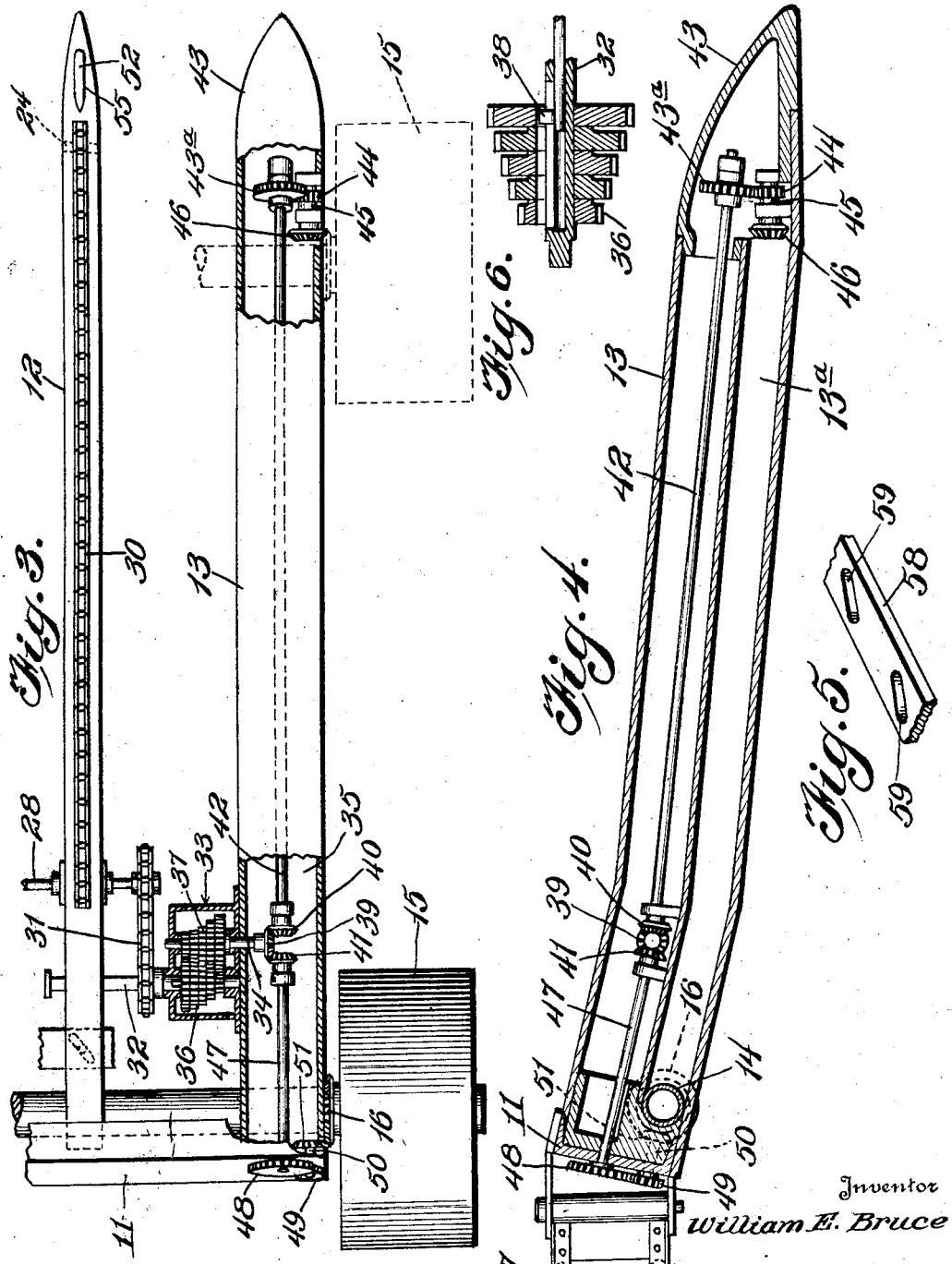

1,628,871

UNITED STATES PATENT OFFICE.

WILLIAM E. BRUCE, OF RANDADO, TEXAS.

FERTILIZER OR STRAW SPREADER.

Application filed October 20, 1925. Serial No. 63,724.

This invention relates to fertilizers or straw spreaders and has for a particular object thereof the provision of a device of this character which may be pushed into a stack of straw or manure to load the same upon a platform which is provided and which may then be withdrawn, carrying with it the load thus placed upon the platform.

A further object of the invention is to provide means for securely clamping the load in position upon the platform which is operable from the seat of the implement.

A further object of the invention is to provide means operable to either load material on the platform or to remove material from the platform in small quantities.

A still further object of the invention is to provide a device of this character having a shiftable axle moving automatically from one end of the platform to the other as the direction of movement of the platform is reversed and so associated with the platform that when the platform is being pushed as, for example, into a straw stack, what is then the forward end of the platform will be dropped in close engagement with the ground so that it will pick up its load cleanly, thus permitting use of the device for gathering scattered manure from stock pens or the like while at the same time when the device is being pulled, the platform is raised out of engagement with the ground so that no undue wear occurs thereon.

A still further object of the invention is to provide means whereby this shiftable axle provides a drive for the loading or unloading mechanism.

Other objects and advantages lie in the details of construction shown in the accompanying drawings, wherein for the purpose of illustration is shown a preferred embodiment of my invention, in which:—

Figure 1 is a plan view of a fertilizer or straw spreader constructed in accordance with my invention;

Figure 2 is a longitudinal sectional view through one of the teeth of the spreader;

Figure 3 is an enlarged plan view partially in section of one arm and the adjacent tooth showing the manner of providing driving connections for the contents of the teeth;

Figure 4 is a longitudinal sectional view through the arms shown in Figure 3;

Figure 5 is a fragmentary perspective of the bar 58;

Figure 6 is a detail sectional view through the clutch;

Figure 7 is a side elevation showing the positions assumed by the spreader when the same is being pushed and illustrating the shifting of the load engaging hooks;

Figure 8 is a perspective of the load engaging hooks showing the mounting thereof;

Figure 9 is a side elevation of the device showing the positions assumed when being pulled.

Referring now more particularly to the drawings, the numeral 10 generally designates a platform, in the present instance, shown as consisting of a head rail 11 to which are attached a plurality of parallel rearwardly extending teeth 12. From each end of the head rail 11 project rearwardly directed arms 13 paralleling the teeth 12. Each tooth 12 and arm 13 is provided with a longitudinally extending slot $12^a$, $13^a$, adjacent the lower face thereof. These slots coact for the reception of an axle 14 which is shiftable from one end to the other of the slot. This axle has supporting wheels 15 at the ends thereof and a supporting wheel at one end has associated therewith a bevel gear 16, for a purpose presently to appear.

To the center of the head rail 11 is secured a tongue 17, the outer end of which provides a mounting for a driver's seat 18 and cross arm 19 to the ends of which is secured means for attaching draft animals, generally designated at 20, this means including a doubletree 21 so connected that it may be swung to place the draft animals in between the cross bar 19 and the head rail or beyond the cross bar 19 from the head rail so that the draft animals may be employed to either push or pull the platform. The connections between the tongue 17 and the platform 10 are such that the platform inclines downwardly from the tongue with the result that when the axle is arranged in the ends of the slots $12^a$, $13^a$ next adjacent the head rail, the free ends of the teeth 12 and arms 13 engage the ground and when the axle is at the opposite end of the slots $12^a$, $13^a$, the entire platform is elevated above the ground and no portion thereof is dragged to cause wear. It will also be noted that the axle 14 will automatically move to the first named end of the slots $12^a$, $13^a$, when the platform 10 is being pushed and to the last named end of the slots when the platform is being pulled.

Thus, when it is desired to pick up material from the ground, the device is being pushed in front of the team and the arms 13 and teeth 12 are lowered into a position where they may readily and cleanly pick up the load. When, on the contrary, the load is to be transported, the weight of the load is borne by the truck wheels and additional friction, such as would be caused by engagement of the teeth and arms, is eliminated.

Each tooth 12 has its upper portion in the form of a housing, the forward end of which provides a shoe 23 for engagement with the ground. In the rear portion of this shoe, on each tooth is mounted a stub axle 24 upon which is mounted a roller 25, the upper edge of which projects through a slot 26 formed in the upper wall 27 of the tooth. Adjacent their rear ends, a shaft 28 extending transversely of the platform is directed through all of the teeth and in the housing of each tooth has secured thereto a sprocket wheel 28ª, the upper face of which projects through a slot 29 formed in the upper wall of the housing. About each roller 25 and sprocket 29, a toothed sprocket chain 30 is passed.

The shaft 28 is connected by sprocket gearing 31 with the output shaft 32 of the transmission 33. This transmission is secured to one of the arms 13 and has an input shaft 34 projecting into a hollow housing 35 formed in this arm. The input and output shafts 32 and 34 have each a plurality of gears 36, 37, the gears 37 being fast to the shaft 34 while the gears 36 are loose upon the shaft and are selectively lockable by a shiftable spline 38 which is likewise movable to a neutral position.

Within the housing 35, the shaft 34, has secured thereto a bevel gear 39 with opposite sides of which engage bevel gears 40 and 41. The gear 40 is fast to a shaft 42 journaled in the housing 35 and in a shoe 43 forming the forward end of this housing. Within this shoe, the shaft has secured thereto a gear 43ª meshing with a gear 44 on a jack shaft 45 journaled in the shoe and having a bevel gear 46 opposing the forward end of the slot and so positioned that it will be engaged by the gear 16 of the supporting wheel when the axle 14 is at the end of the slot remote from the rail head. The gear 41 is fast to a shaft 47 which is likewise journaled in the housing 35 and this shaft has its rear end projected through the rail head and provided with a second gear 48. The gear 48 meshes with the gear 49 on a jack shaft 50 having a bevel gear 51 meshing with the gear 16 of the supporting or truck wheel 15 when the axle 14 is in the end of the slots 12ª, 13ª, next adjacent the head rail. It will be seen that a means is thus provided for positively driving the chains 30 in either direction and that when the platform is being pushed, the chains will be operated to draw material on to the platform while, when the platform is being pulled, the chains will be operated to discharge material from the platform.

Since the platform 10 inclines rearwardly at all times, it will be obvious that some means of retaining the load upon the platform must be provided. These means include fingers 52, pivoted, as at 53, in a slot 54 formed in each of the teeth and more particularly in the upper surface of the shoe of the teeth. Each finger 52 is in the form of a bell crank lever, one arm of which forms the finger proper and the other arm of which is attached to a link 55 extending rearwardly through the housing 22 and having an upturned rear end 56. The walls of the housing 22 in alignment with these rear ends have formed therein slots 57 through which are directed a bar 58 having a diagonally extending slot 59 for each tooth and through which the upturned end 56 of the link 55 of each tooth is directed.

The upper surface of the bar at the approximate center thereof is formed as a rack 60 and with this rack meshes a pinion 61 mounted upon a shaft 62 extending to the point adjacent the driver's seat and they are provided with means, as at 63, whereby it may be rotated. It will be obvious that by rotating this shaft, the links 55 may be shifted longitudinally and by their shifting will either throw the fingers to a vertical position or to a substantially horizontal position in which latter position, the fingers close the slots 54 so as to prevent entry of dirt and the like into the housing. The bottom of each housing 22 has preferably formed therein an opening 64 through which dirt may escape as it is dragged through the housing by the chains 30. The means for retaining the load further includes vertical standards 65 carried by the head rail 11 and having pivoted thereto a plurality of hooks 66 connected by a cross bar 67 for simultaneous operation by means of a flexible connection 68 extending to a point adjacent the driver's seat.

In the use of the device, assuming the operator desires to pick up a load consisting of a portion of a straw stack, he swings his draft animals to the position between the bar 19 and the head rail 11 so that they are pushing the platform 10. As the platform is moved, its initial movement causes the axle 14 to move to the head rail end of the slots 12ª, 13ª, and the fingers 12 and arms 13 to lower so that their shoes are engaged with the ground to pick up material therefrom. At this time, the hooks 66 are arranged in a substantially vertical position and the fingers 52 are concealed within their slots. As the forward movement of the platform continues, the gear 16 meshing with the gear 51 drives the chains 30 so that their upper runs travel toward the head rails 10 and anything resting upon the upper surface of the fingers will be moved toward the rear end of the fingers. When the device is fully engaged with the stack, the operator manipulates the means 63 to raise the fingers 52 and drops the hooks into the stack so that these two elements act to hold the load in position upon the platform. At the same time, the transmission is placed in neutral so that no movement of the chains 12 takes place tending to cause discharge of load from the platform. Arriving at the point where it is desired to discharge the load, the transmission is placed in proper gear and with the team pulling the platform, the upper runs of the chains will move toward the rear ends of the teeth, discharging material therefrom against resistance of the fingers 52 and of the hooks 66. If it is desired to bodily dump the load which is carried, this may be accomplished by elevating the hooks to disengage them from the load and depressing the fingers 52 to their concealed position.

It will be obvious that the means of distribution or discharge may be altered as is found desirable without in any manner departing from the spirit of my invention and I accordingly do not limit myself to such specific structure except as hereinafter claimed.

I claim:—

1. In a device of the type described, a platform, means for moving the platform in opposite directions and means operated by reversal of movement of the platform for causing one end of the platform to move into or out of engagement with the ground including a wheel supported axle for the platform freely shiftable from one end of the platform to the other thereof.

2. In a device of the type described, a platform, means for moving the platform in opposite directions, means operated by reversal of movement of the platform for causing one end of the platform to move into or out of engagement with the ground including a wheel supported axle for the platform freely shiftable from one end of the platform to the other thereof and load shifting means carried by the platform and adapted to be driven from said axle when the latter is in either of its extreme positions.

3. In a device of the type described, a platform, means for moving the platform in opposite directions, means operated by reversal of movement of the platform for causing one end of the platform to move into or out of engagement with the ground including a wheel supported axle for the platform freely shiftable from one end of the platform to the other thereof and load shifting means carried by the platform adapted to be driven from said axle when the latter is in either of its extreme positions, the driving connections of said axle and load shifting means including means whereby said load shifting means is reversely operated when the axle is at one end of the platform to the direction of operation when the axle is at the opposite end of the platform.

4. In a device of the type described, a platform, means for shifting a load upon the platform toward or away from one end thereof, means for moving the platform in opposite directions and means for driving the load shifting means in a direction opposite to the direction of movement of the platform including a part supporting the platform and operated by reversal of movement of the platform to shift said end of the platform into or out of engagement with the ground.

5. In a device of the type described, a platform, means for shifting a load upon the platform toward or away from one end thereof, means for moving the platform in opposite directions and means for driving the load shifting means in a direction opposite to the direction of movement of the platform including a wheel supported axle for the platform freely shiftable from one end of the platform to the other thereof, said end of the platform when the axle is at one end of the platform being in engagement with the ground and when the axle is at the opposite end of the platform being maintained in spaced relation thereto.

6. In a device of the type described, a platform, means for moving the platform in opposite directions and means operated by reversal of movement of the platform for causing one end of the platform to move into or out of engagement with the ground including a wheel supported axle for the platform freely shiftable from one end of the platform to the other thereof and load shifting means carried by the platform and driven from said axle, the driving connections between said axle and said load shifting means being reversely operated when the axle is at one end of the platform to the direction of operation when the axle is at the opposite end of the platform, said driving connection including a transmission having a neutral point.

7. In a device of the type described, a platform including a plurality of longitudinally extending fingers, a conveyor chain associated with each finger, means for moving the platform in opposite directions, means operated by reversal of movement of the platform for causing one end of the platform to move into or out of engagement with the ground including supporting wheels for the platform and means operated by movement of the wheels in either direction for operating said conveyor chains.

8. In a device of the type described, a platform, means for shifting a load upon the platform toward or away from one end thereof, means for moving the platform in opposite directions and means for driving the load shifting means in a direction opposite to the direction of movement of the platform including a wheel supported axle for the platform freely shiftable from one end of the platform to the other thereof, said end of the platform when the axle is at one end of the platform being in engagement with the ground and when the axle is at the opposite end of the platform being maintained in spaced relation thereto, said axle, when at opposite ends of the platform being oppositely operatively connected with said load shifting means and means for rendering said connection inoperative.

9. In a device of the type described, a platform, means for shifting a load upon the platform toward or away from one end thereof, means for moving the platform in opposite directions, means for driving the load shifting means in a direction opposite to the direction of movement of the platform including a part supporting the platform and operated by reversal of movement of the platform to shift said end of the platform into or out of engagement with the ground, vertical standards carried by the opposite end of the platform and hooks operatively pivoted to said vertical standards and movable to engage with or disengage from the load carried by the platform.

10. In a device of the type described, a platform, means for moving the platform in opposite directions and means operated by reversal of movement of the first named means for causing one end of the platform to move into or out of engagement with the ground while maintaining the platform in a load supporting position.

In testimony whereof I hereunto affix my signature.

WILLIAM E. BRUCE